Sept. 27, 1955   H. J. EMERSON   2,719,235
CONTINUOUS INSPECTION BY OPTICAL SCANNING
Filed April 8, 1954
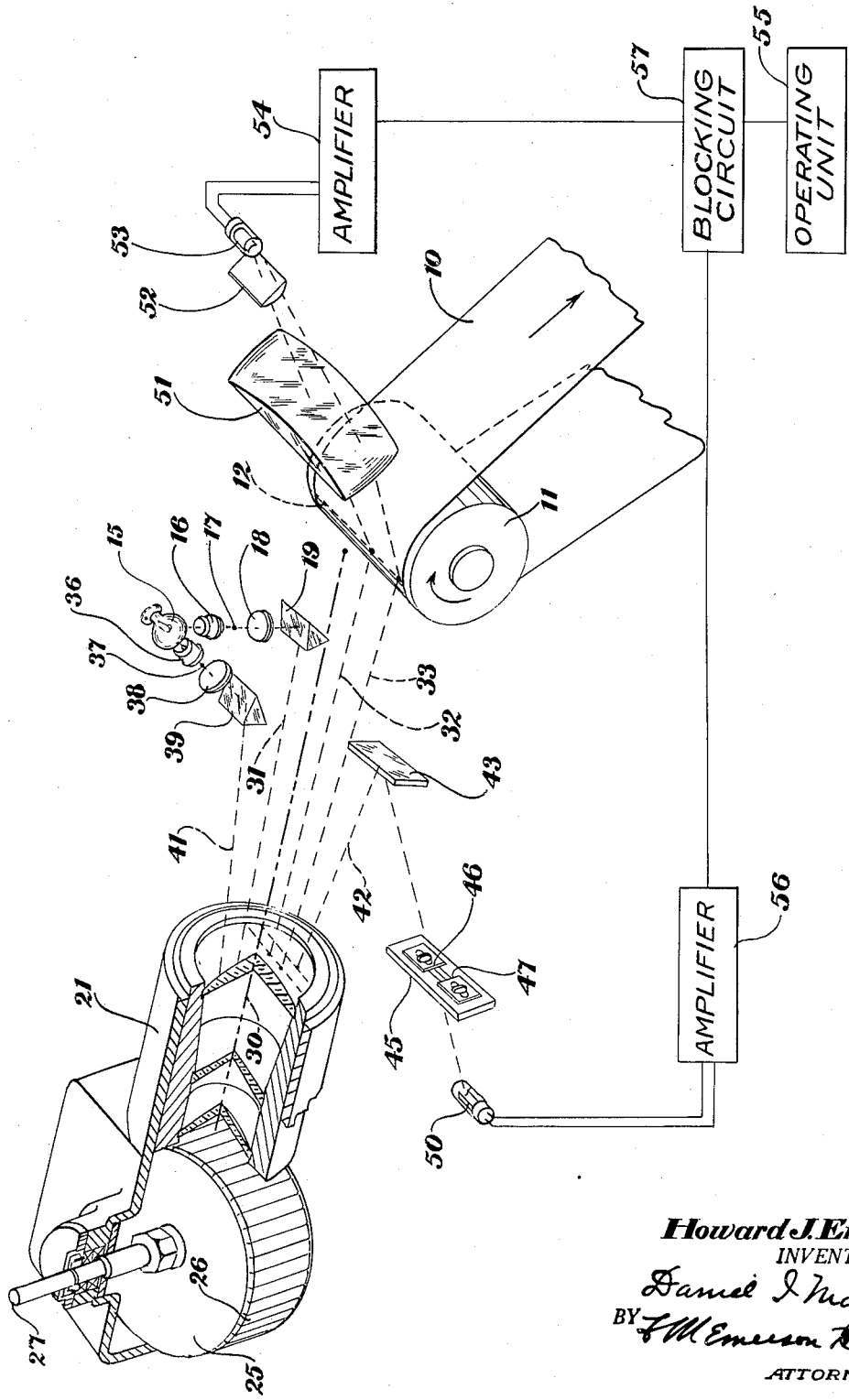
Howard J. Emerson
INVENTOR.
BY Daniel I. Mayne,
F. M. Emerson Holmes
ATTORNEYS United States Patent Office 2,719,235
Patented Sept. 27, 1955

2,719,235

CONTINUOUS INSPECTION BY OPTICAL SCANNING

Howard J. Emerson, Rochester, N. Y., assignor to Eastman Kodak Company, Rochester, N. Y., a corporation of New Jersey Application April 8, 1954, Serial No. 421,877

2 Claims. (Cl. 250—209)

This invention relates to apparatus for the continuous inspection of a moving band or ribbon. It relates particularly to such a scanning system in which a flying spot of light sweeps transversely across the moving band of film and is transmitted or reflected to a photoelectric cell.

It is the object of the invention to provide a highly sensitive, high-speed scanning system which will detect small defects within a predetermined area or width of the moving film, but which at the same time will be insensitive to defects outside of this area and insensitive to changes in light intensity caused by the flying spot reaching the edges of the film band.

Reference is made to my cofiled application Serial No. 421,876 on an electric circuit, one form of which is particularly useful with the present invention and to a cofiled application Serial No. 421,875 by John H. Juengst and me on a magnetic memory useful with one form of the present invention. A lens system particularly suitable for use in the present scanner is described in copending application Serial No. 420,056 filed March 31, 1954 by William Donald Orser.

In the present invention, the inspection spot, or more exactly, the succession of the inspection spots of light is provided by an optical system consisting of a light source, a lens for focusing a beam from the source to form a spot and a rotating drum of mirrors for reflecting the beam and causing the spot to move. The mirrors are of equal width and are arranged contiguously and tangentially on the drum facing outwards. According to the invention a separate succession of monitor spots of light are also formed by light reflected from the same rotating drum. It is not necessary to use the same source of light and the same lenses, but the preferred embodiment of the invention does use a single source of light and at least some of the lenses are common to both optical systems. The monitor spots are focused in a plane to one side of the scanning beam so as not to interfere with the primary scanning system. This monitor plane includes a diaphragm with a relatively small aperture.

As the primary scanning spot sweeps across the film under inspection it first enters the primary scanning area at a limit which may be referred to as the on-edge and it leaves the scanning area at a point which may be referred to as the off-edge. Similarly the monitor spot enters the diaphragm area at one edge of the diaphragm and leaves at the other. The diaphragm is so adjusted that the monitor spot is on the entering edge of the diaphragm area while the scanning spot is on the off-edge of the scanning area and the monitor spot reaches the other edge of the diaphragm just at the time the next succeeding inspection spot reaches the on-edge of the area under inspection.

Light transmitted through the aperture in the monitor plane falls on a monitor photocell which is connected to a blocking circuit or control means so as to render the output of the photoelectric cell which receives the inspection spot, ineffective while light is falling on the monitor cell.

The invention will be more fully understood from the following description when read in connection with the accompanying drawing which constitutes:

A perspective view of the optical system and a block diagram of the electrical circuit according to a preferred embodiment of the invention.

In the drawing, a film 10 which is to be inspected for defects and flaws moves over a roller 11 so as to form a flat transverse line 12 which is to constitute the scanning line. Light is focused to a spot which moves along the line 12 transversely to the direction of motion of the film 10.

The light is provided by a light source 15 which is focused by a lens 16 to form a small real image 17. Light from the image 17 passes through a filter 18 which, in the case of the inspection of photographic film, may be an infrared transmitting filter so that the spot of light at the scanning line will have no tendency to fog the film. The light is then reflected by a prism 19 through a lens 21 which in the arrangement shown acts as a collimator since the real image 17 is at the focal plane of the lens 21. The light passing through the lens 21 falls on one or more of the facets 26 of a rotating drum of mirrors 25. The light reflected by one of these facets back through the lens 21 is focused by the lens on the scanning line 12.

The optic axis of the lens 21 is indicated by the line 30. The light from the prism 19 travels toward the lens along the line 31 and, when a particular facet 26 is orthogonal to the optic axis 30 the light returns along the line 32. As the drum 25 rotates, this light beam axis 32 moves to the end of the line 12 as indicated by the light ray 33. In the particular arrangement shown, the film is inspected by reflected light, but, of course, it could be inspected by transmitted light. The light reflected from the scanning line 12 is focused by aspheric lens 51 and cylindrical lens 52 on a photoelectric cell 53 which through an amplifier 54 operates some form of operating unit 55. The operating unit may take any form such as a simple recorder, a counter, a device for marking the area of the film which is defective such as by an inking mechanism or by cutting a notch in the edge of the film or it may be a more involved arrangement for sorting the film after it is chopped into standard lengths. The present invention is not essentially concerned with the type of operating unit. The above mentioned cofiled applications by myself and jointly by John H. Juengst and myself describe a sorting mechanism with which the present invention may be used.

Light from the lamp 15 is also focused by a lens 36 to form a second real image 37. Light from this real image 37 passes through a light filter 38 and is reflected by a prism 39 to form a light beam represented by the line 41. After this light passes through the lens 21 and is reflected by the facets 26 on the rotating drum 25, it is focused as indicated by the line 42 to form an image in a monitor plane to one side of the main optical system. This monitor beam passing along the line 42 is reflected by a mirror 43 to the monitor plane which contains a diaphragm 45 having adjustable edges 46 and 47. The monitor spot passing through the diaphragm is received by a photoelectric cell 50 which, through suitable amplifying circuit 56 operates a blocking circuit 57 to prevent any defect signal from the photocell 53 operating the operating unit 55 while light is falling on the photocell 50. The blocking circuit 57 may take any standard form such as a multiple grid tube in which the monitor signal operates on one of the screen grids to render the scanning signal on the control grid ineffective. Blocking or gating circuits are known and the particular form thereof is not an essential feature of the present invention.

The edge 46 of the diaphragm 45 is positioned so that the monitor spot is on this edge just at the moment the scanning spot moving along the scanning line 12 arrives at the off-edge of the area of the film 10 which is to be scanned. The off-edge is indicated by the ray 33 striking a point just inside the actual edge of the film 10. As long as the scanning spot is falling on the film 10 within the area to be scanned, there is no monitor light passing through the diaphragm 45 and hence, there is no light falling on the photocell 50. As the scanning spot indicated by the ray 33 continues to move away from the scanning area the next successive scanning spot produced by the next facet on the scanning drum 25 starts to come onto the film 10 but does not arrive at the scanning area until some time after the first scanning spot has left the scanning area. The leaving edge 47 of the monitor diaphragm 45 is positioned to correspond precisely to the on-edge for this next succeeding scanning spot. Thus, light passes through the diaphragm 45 to the cell 50 only during that interval defined by the time the scanning spot leaves the off-edge of the inspection area of the film 10 and the time the next successive scanning spot arrives at the on-edge of the scanning area of the film. Thus, a single photocell 50 monitors both the on-edge and the off-edge limits of the scanned area. With this arrangement the scanning system refuses to respond to the changes in light intensity caused by the edges of the film 10 or any changes caused by defects just inside the edges of the film 10. This arrangement permits particularly high speed scanning and insures that, in the absence of defects, the light reflected from the film 10 remains effectively uniform and produces no effective signal in the output of the photocell 53. That is, extraneous signals are nullified by the monitor signals produced according to the present invention. The edges 46 and 47 are shown adjustable, but in practice they are positioned or located as specified above (for example by machining to size) and then left fixed.

It should be noted that the transverse scanning by the present invention may be in either direction. That is, the drum 25 may rotate in either direction and the device will operate in the same way although the reversal will make the edge 46 the leaving edge and the edge 47 the entering edge of the diaphragm 45, and the on-edge and off-edge of the inspection area will also be interchanged.

I claim:

1. A flying spot scanner for the inspection of an area of fixed width on a moving sheet comprising a rotating circular drum of mirrors of equal width contiguously and tangentially mounted facing outwards, means for illuminating the mirrors, means for focusing a succession of inspection spots of light reflected from the mirrors onto the moving sheet to scan the sheet transversely one spot at a time, between and beyond the limits of said fixed width as the drum rotates, said limits being hereinafter referred to respectively as the on-edge and off-edge limits to identify where the inspection spots enter and leave the area, a photoelectric cell arranged to receive light reflected from the sheet illuminated by one of said inspection spots, an output circuit for the photoelectric cell responsive to changes in the intensity of light incident thereon to form signals corresponding to such changes including any caused by defects in the sheet, means for focusing a succession of monitor spots of light reflected from the mirrors in a monitor plane outside of the beam of light forming the inspection spots, diaphragm means in the monitor plane having edges for an aperture across which edges and aperture the monitor spots sweep as the drum is rotated, the edge at which the monitor spots enter the aperture being located so that a monitor spot is on said edge when an inspection spot is on the off-edge limit of the sheet and the edge at which the monitor spots leave the aperture being located so that this same monitor spot is on said leaving edge when the next succeeding inspection spot is on the on-edge limit of the sheet, a monitor photoelectric cell positioned to receive light transmitted through said apertures and means controlled by said monitor cell for rendering the output circuit of the first mentioned cell ineffective while light is falling on the monitor cell.

2. The combination of a flying spot scanner for the inspection of a moving sheet and a monitor for rendering the inspection effective only within an area of fixed width on the sheet, the scanner consisting of means for producing a succession of spots of light, uniformly spaced more than said width, which scan the sheet transversely and a photoelectric cell arranged to receive the light after it is incident on the sheet with the output of the cell controlling an operating unit, and said monitor comprising means for producing another succession of flying spots of light from the same scanner in a monitor plane outside the beam of light forming the inspection spots, diaphragm means in the monitor plane having edges for an aperture scanned by the monitor spots, the edge at which the monitor spots enter the aperture being located so that a monitor spot is on said edge when an inspection spot is on the limit edge of the sheet area at which the inspection spots leave said area and the aperture edge at which the monitor spots leave the aperture being located so that the same monitor spot is on said leaving edge when the next successive inspection spot is on the limit edge of the sheet area at which the inspection spots enter said area, a monitor photoelectric cell positioned to receive light transmitted through said aperture and means controlled by said monitor cell for nullifying the effect of the output of the first mentioned cell while light from a monitor spot is falling on the monitor cell.

References Cited in the file of this patent

UNITED STATES PATETNS

| | | |
|---|---|---|
| 1,859,047 | Paulson | May 17, 1932 |
| 2,486,334 | Slamar | Oct. 25, 1949 |
| 2,545,331 | Works | Mar. 13, 1951 |